United States Patent
Zamel et al.

[11] Patent Number: 5,991,319
[45] Date of Patent: Nov. 23, 1999

[54] MIRROR FAILURE DETECTOR FOR HIGH POWER LASERS

[75] Inventors: James M. Zamel, Hermosa Beach; Robert Tinti, Lakewood, both of Calif.

[73] Assignee: TRW Inc., Redondo Beach, Calif.

[21] Appl. No.: 08/975,834

[22] Filed: Nov. 21, 1997

[51] Int. Cl.$^6$ .................................................. H01S 3/105
[52] U.S. Cl. ................. 372/34; 372/99; 372/107
[58] Field of Search .................. 372/29, 33–36, 372/38, 95, 99, 107–109

[56] References Cited

U.S. PATENT DOCUMENTS

| | | | |
|---|---|---|---|
| 4,906,849 | 3/1990 | Duo et al. | 250/338.3 |
| 5,177,756 | 1/1993 | Rockstroh et al. | 372/38 |
| 5,268,975 | 12/1993 | Yoshitani et al. | 385/22 |
| 5,347,392 | 9/1994 | Chen et al. | 372/95 X |

*Primary Examiner*—John D. Lee
*Attorney, Agent, or Firm*—Michael S. Yatsko

[57] ABSTRACT

A detector 50 is included in a laser apparatus for generating a high energy laser beam to protect against the uncontrolled escape of the high energy laser beam from its prescribed optical path 14. The high energy laser beam proceeds along the optical path 14 and is directed to a work site 44 by a series of reflective surfaces in its path 26 and 30. The series of reflective surfaces function to change the path 14 of the beam 32 from the generating source to the work station 44. Associated with each of the reflective surfaces is a detector 50 which comprises a conductive frame 51 having a front face 52 and a back face 54. The back face 54 is equipped with a thermal sensor 60 which is positioned in a base portion 64 of the heat conductive frame 51. The detector is equipped with cooling means 58 and 66 for maintaining the threshold temperature. The sensor 60 which is affixed to the base portion 64 having a controlled thickness is preset at a threshold temperature such that in the event the reflective surfaces 26 or 30 breaks or otherwise fails permitting the beam 32 to strike the heat conductive frame 51 it would cause sudden rise in temperature of the sensor which would trigger the control circuit 69 to shut down the power supply 92 that energizes the high energy gain module 12.

17 Claims, 3 Drawing Sheets

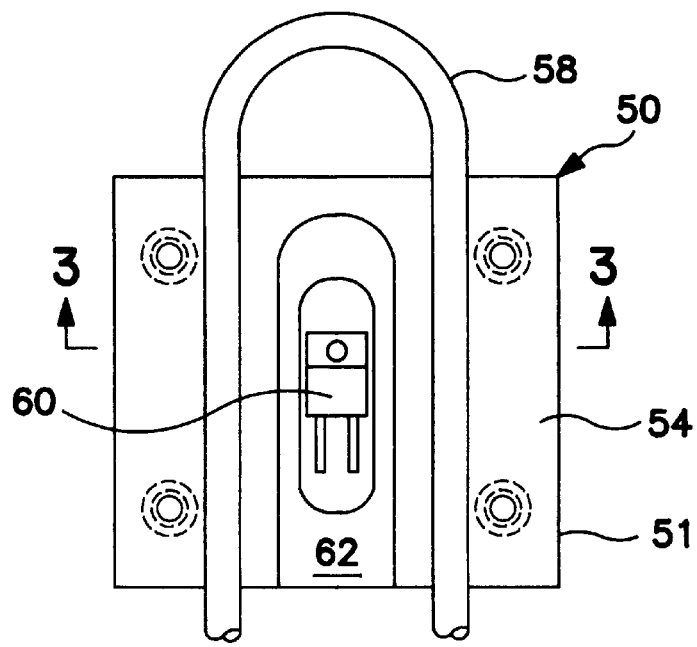
FIG. 2
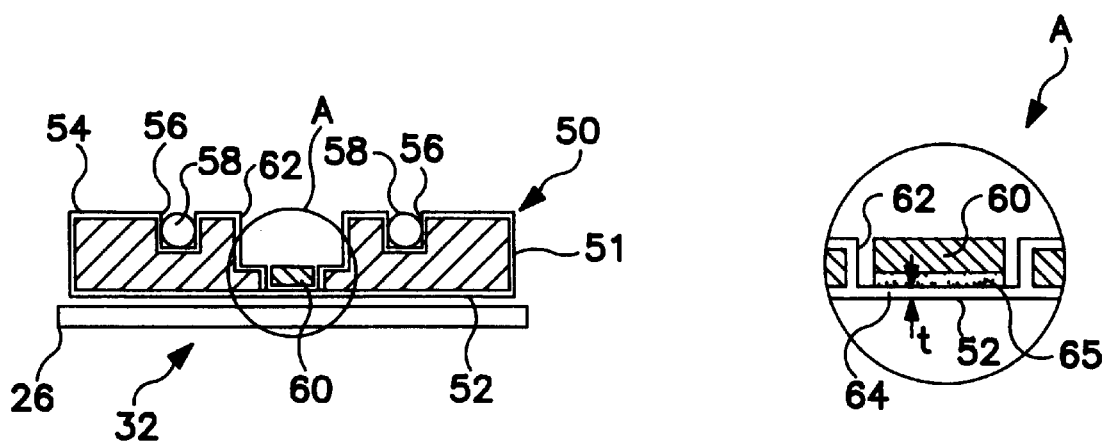
FIG. 3
FIG. 3A

MIRROR FAILURE DETECTOR FOR HIGH POWER LASERS

BACKGROUND OF THE INVENTION

1. Technical Field

This invention relates generally to the optical systems of high energy laser apparatus an more particularly to protection devices for sensing when the potentially damaging radiation breaks free from its designated optical path posing a hazard to the environment outside the optical system.

2. Discussion

High energy lasers have demonstrated utility for many industrial applications. Such laser beams can be used for manufacturing operations ranging from welding automobile body frames to drilling small size holes in metal. The systems are reliable, they can perform with very exacting precision and perform those tasks quite rapidly. As these systems come into greater usage they could pose a hazard to the general working environment in which they are employed unless equipped with appropriate protective devices.

A brief explanation of the construction of the high energy laser system may be helpful in providing a better understanding of the need for protective devices to be incorporated in the apparatus. The high energy laser systems generally comprise a solid state laser source such as a power oscillator that generates a pulse beam, a zig-zag slab gain medium for generating the high power beam. The amplified beam is out-coupled or extracted with a generated beam that ranges from 10 watts to 5,000 watts and greater. The optical path of the beam is such that as it is out-coupled from the laser cavity it is directed onto a series of reflecting surfaces and thereby transmitted to the work site where the beam is to be used. The laser slab that is employed is generally a neodymium YAG ("Nd-YAG") single crystal which is positioned between two reflective surfaces, one which is totally reflective at the front end of the laser slab and at the other end of the laser slab the energy beam is out-coupled through another surface that is partially transmissive and partially reflective. The total reflectivity of the surface at the front end redirects the beam back into the slab and proceeds to zig-zag back and forth between the two reflecting surfaces as it gets properly amplified and is then out-coupled.

It will be understood that the invention is not limited to a particular laser system or geometry. The failure detectors of this invention can be used to advantage with any laser gain medium such as gas, chemical or solid state, equipped with appropriate reflecting mirrors. The light is collimated and amplified by cycling it back and forth through the gain medium.

As long as the high intensity beam remains on the pre-determined optical path from the totally reflecting surface through the out-coupling reflective surface and through the other parts of the optical system until it reaches the work site through a controlled path there is no particular hazard. However, in the circumstance one of the reflective surfaces or other parts of the optical path should experience mechanical failure or for any reason cease to intercept the high power beam, the high energy beam will escape the intended beam path and pose a risk to the environment of the apparatus.

Previous attempts to monitor the conditions in the high energy laser apparatus employed thermal responsive fuse type structures positioned behind the mirrors that melted or fused when heated beyond a threshold temperature. Thermal fuses are bulky and useable only one time. The escape of a 5000 watt beam from its optical path could readily strike through the containing walls of the apparatus and cause damage to property and persons in fractions of a second. The hazards to persons in the vicinity of the apparatus could result in blindness and cause severe burns.

There is a need for detection devices that respond very quickly de-energizing the system thereby minimizing any delay factor between the time mirror failure occurs and the response of any sensing device thereby preventing the beam from escaping from the intended path and is reuseable.

SUMMARY OF THE INVENTION

The detection apparatus which detects failure caused by exposure to high energy laser radiation comprises an optically absorptive shield in the optical path, a heat sensing device, the detector is disposed immediately behind the shield for sensing changes in temperature, the detector comprising (i) a conductive metal frame having a heat receptive face portion and formed with channel means for receiving a temperature sensing element therein, said temperature sensing element positioned in heat conductive relation to the radiation absorptive face, the temperature sensor being preset at a threshold temperature; (ii) cooling means for cooling said sensing means to a level below said threshold temperature; and (iii) control means responsive to said sensing means for de-energizing the high temperature laser radiation source. The temperature sensor is disposed within a channel within the conductive metal frame said channel being separated from the radiation absorptive face by a base portion having a controlled thickness. The temperature sensor is affixed to the base portion of the channel immediately opposite the radiation absorptive face of the heat conductive frame. The radiation absorptive face portion is treated with a radiation absorptive coating.

The base portion of the air channel and on which is mounted the sensor is of a very finite thickness to provide the appropriate sensitivity to increases in temperature and thereby respond within a predictable time. The detector is equipped with cooling means to maintain the metal frame at a controlled temperature level below the threshold temperature. The threshold temperature represents the normal operating temperature of the apparatus. When the detector senses an increase in excess of the threshold temperature it triggers the de-energization of the power supply to the high energy laser radiation source. The cooling means comprises the use of cooling liquid in a heat exchanger and alternatively the detector is conductively mounted to a supporting base or wall to which is conducted the heat that is absorbed in the frame member. A heat-conductive adhesive is used to secure the sensor to the base portion of the channel within the heat conductive frame.

BRIEF DESCRIPTION OF THE DRAWINGS

These and other features, aspects and advantages of the present invention will become better understood with reference to the following description, appended claims and accompanying drawings where:

FIG. 2 is a plan view of the back face of the heat conductive metal frame that houses the detector positioned to intercept radiation that strikes the front face of the heat conductive frame;

FIG. 3 is a cross-section along lines 3—3 of FIG. 2 of the conductive metal frame showing the mounting of the sensor in the channel immediately behind the heat absorbing surface.

FIG. 3A is an enlarged detail of the mounting of the thermal sensor of FIG. 3.

DETAILED DESCRIPTION OF THE PREFERRED EMBODIMENT

Figure 1:
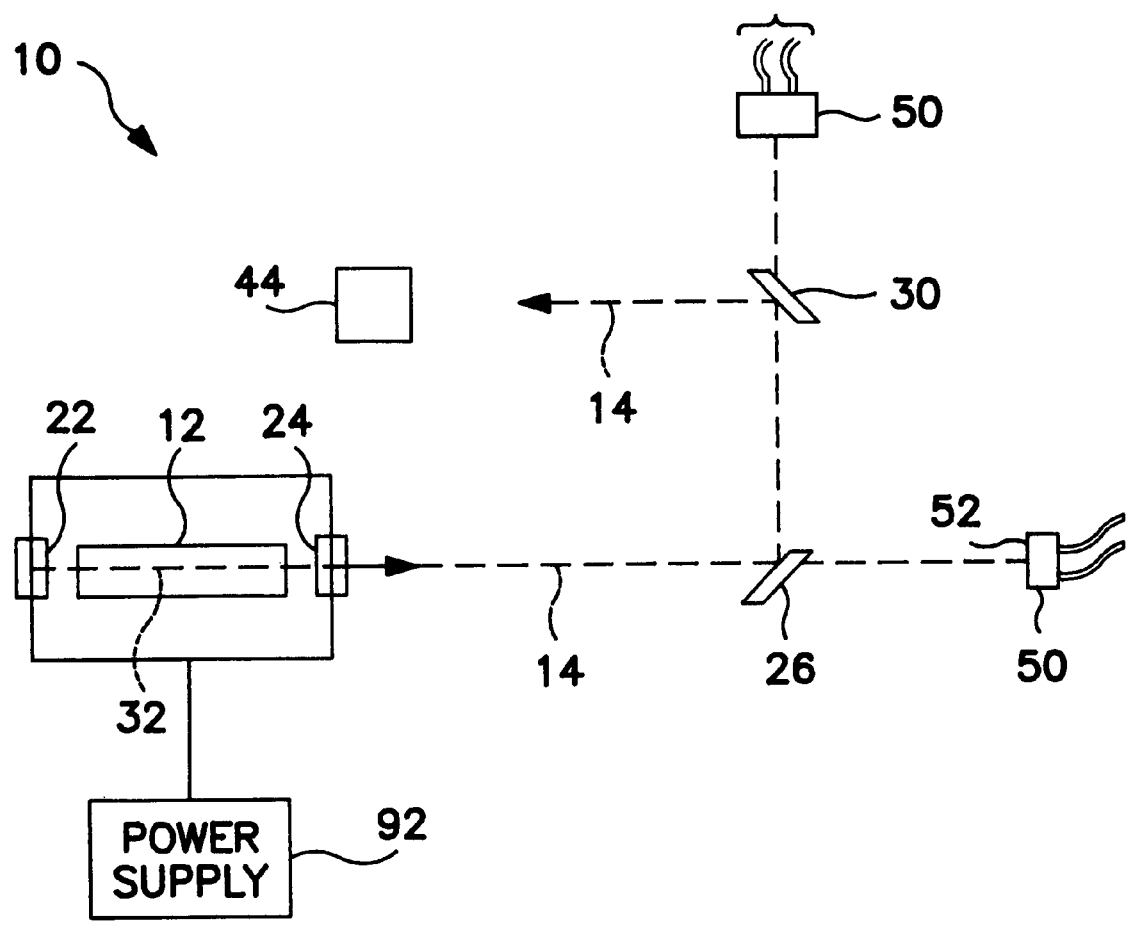
FIG. 1 is a sketch of a high energy laser radiation apparatus showing the path of the laser beam generated by a gain module which undergoes total reflection and partial reflection so that it cycles back and forth through the laser slab and is then out-coupled along a path to the working site.
Figure 4:
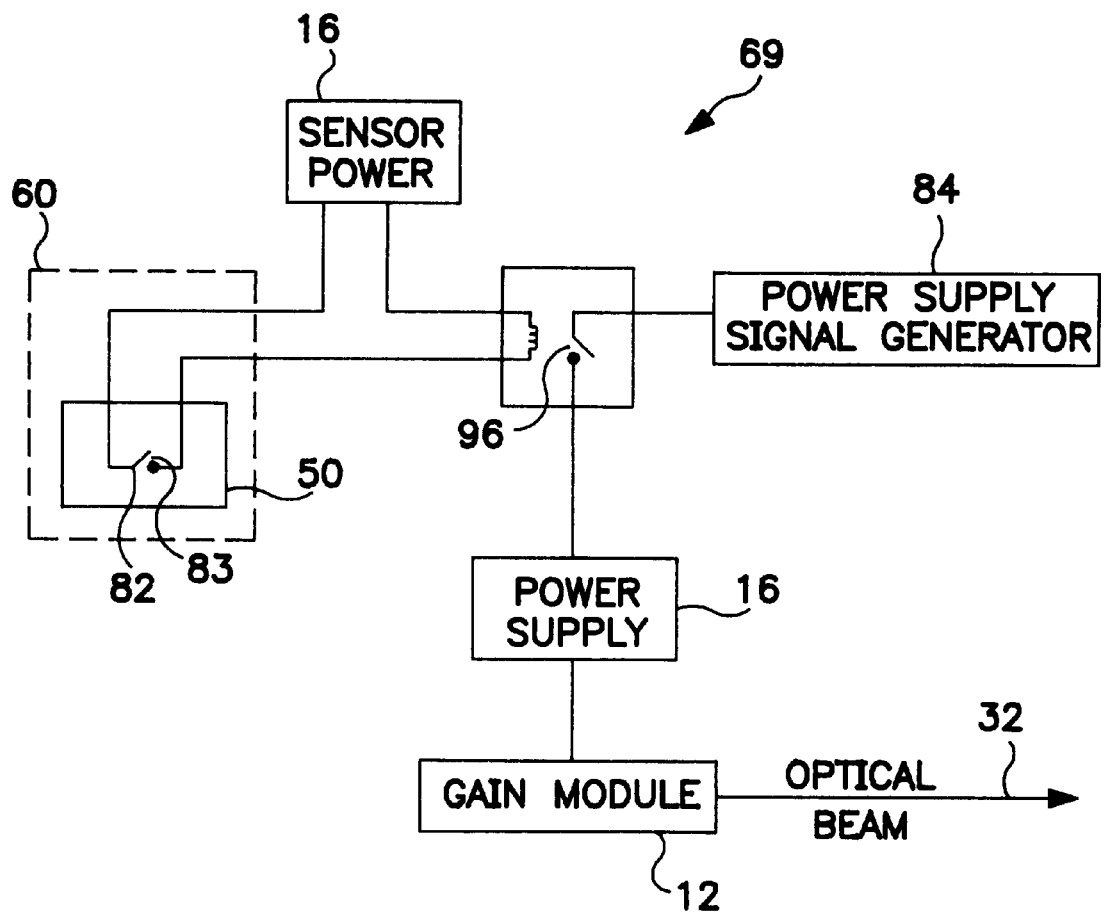
FIG. 4 is a schematic of a control circuit that shuts down the high intensity laser in the event of mirror failure.

With reference to FIG. 1 there is shown the laser radiation apparatus identified generally with the numeral 10 which includes the laser gain module 12 including the Nd-YAG slab crystal and a series of reflective surfaces 22, 24, 26 and 30 that defines an optical path 14. The reflective surface 22 totally reflects the beam 32 that is generated from the laser gain module. As explained earlier the high energy laser generators typically employ a slab single crystal of Nd-YAG which is excited by banks of laser diodes housed adjacent the Nd-YAG slab not visible in the figures. The laser gain module is powered from a power supply 92 (FIG. 4).

The totally reflected radiation beam 32 is directed back into the gain module 12 where it passes back and forth and exits from the other end of the module by striking another reflective surface 24. The reflective surface 24 is partially transmissive of the radiation. The transmitted radiation is out-coupled and forms the functionally useful high energy laser beam. The remaining portion of the incident radiation is reflected back into the laser cavity where it again traverses through the gain module undergoing amplification until it attains an energy level so that the out-coupled radiation beam 34 is a functionally useful high energy laser beam which then proceeds along the optical path 14 shown in the dashed lines in FIG. 1.

Upon exiting the out-coupling reflector 24 the beam 32 proceeds along the folded optical path 14 which ultimately is directed to a work site 44. The course of the beam 32 along the path 14 causes it to impinge on two reflective surfaces 26 and 30 in order that the beam change direction to reach the target or work site 44.

Each of the reflective surfaces that form part of the optical path 14 and intercept the radiation beams generated by the laser is equipped with a detector 50 that senses sudden onset of temperature rise above the threshold level. The detector 50, shown in FIGS. 2, 3 and 3A comprises a conductive frame member 51 having a front face 52 and a back face 54. FIG. 2 shows the back face 54 facing away from the on coming laser beam 32. The conductive frame 51 is equipped with the thermal sensor 60.

Turning now to FIGS. 3 and 3A the detector 50 includes the sensor 60 which is positioned in a recess 62 within the back face 54 of the heat conductive frame member 51. The sensor 60 is a thermistor which is available from Airpax Corporation identified as model no. 67L110. The sensor 60 resides on a thin base portion 64 having a thickness "T" and is placed in heat conductive relationship to the surface 52. As the face portion 52 heats up it will conduct the heat through the base portion 64 to the sensor 60. The thickness "T" therefore of the base portion 64 represents a control element in minimizing the response time of the sensor 60 in the event a particular reflective surface, such as for example, 26 breaks or fractures permitting the beam 34 to escape from the path 14. It has been found that the operable range for "T" is from 0.020 inches to 0.040 inches, the preferred range being from 0.028 inches to 0.033 inches. It is essential that the sensor 60 be able to respond in fractions of a second in the event the reflective surface is removed or otherwise made unavailable to intercept the beam. Understandably if the base portion 64 is too thick then a rather substantial period of time will be consumed in heating up the face 52 of the detector before it reaches the sensor 60 to initiate shutdown of the power supply 92 to the laser.

It has been found that the manner of affixing the sensor 60 to the base portion 64 is best accomplished using a heat conductive adhesive applied in a thin film 65 shown in FIG. 3A. A silicone based adhesive available from Nusil Technology of Carpenteria California identified as Nusil CV-2946 provides the desirable results.

There is provided a cooling duct 56 that encircles the central area of the back face 54. The duct 56 carries a water circulating stainless steel tube 58 for maintaining the heat conduction at a pre-set temperature. It is preferred that the conductive frame member 51 have the necessary absorptivity in order to effectively predict the temperature at the sensor caused by the laser. Accordingly the conductive frame member 51 is applied a matt black chromium plating to provide the desirable absorptivity.

In another embodiment the frame member 51 can be maintained at a pre-set temperature using a different form conductive transfer in place of water cooling. Referring to FIG. 2 it was found that the metal fasteners 66 which secure the metal frame 51 to a heat conductive wall or base support can function to remove any accumulated heat from the frame, without the requirement for water cooling, to maintain the temperature level of the frame 51 at the pre-set reference temperature representative of the temperature that exists in the working environment of the apparatus. The conductive frame member 51 may be secured to a wall by the fasteners 66 or to a base support.

The very nature of the laser generating apparatus employing reflective surfaces results in the leakage of light energy through the reflective surfaces that typically strike each detector 50. This creates a normal operating temperature level for the apparatus. The sensor 60 is pre-set at a threshold temperature level higher than the temperature level that exists in the operating environment for the laser generating apparatus during normal operation. The use of the cooling ducts 56 into which is placed stainless steel tubing through which circulates cooling water or alternatively the conductive fasteners 66 maintains the temperature of the heat conductive frame 51 at the temperature which is below the triggering level at which the system is shuts down.

Referring to FIG. 4 there is shown the control circuit identified generally with numeral 69 that is triggered when the detector 50 senses the sudden increase in temperature in the event of a failure of one of the reflective surfaces 26 and 30. The detector 50 functions as a normally closed switch 82 shown in the open position indicating mirror failure. The switch is powered from the sensor power supply 16. The controller signal generator 84 also provides a signal through the relay 90 that controls the power supply 92 for the gain module 12. When the temperature level of the detector 50 is below the threshold temperature contacts 83 of switch 50 are closed. This represents normal operation. The contacts 96 of the relay 90 are closed in response to the signal generator 84 so that current flows to the power supply 92 and maintains the laser module 12 energized.

In the event the sensor 60 increases in temperature above the threshold of the triggering level the contacts 83 open as shown interrupting the power to the relay 90 by the generator 84 causing the relay to open its contacts 96. With contacts 96 open it interrupts the supply of power 92 to the gain module 12 shutting down the system.

In operation, the beam 32 exits the gain module 12 in the direction of the reflective surface 26. In the event the reflective surface 26 fails to intercept the beam it will strike the front face 52 of the detector 50 and in approximately 2–3 seconds heats up the face 52. Conduction through the thickness of 0.03 inches of the face 52 heats up the base portion 64 and thereby causes the sensor 60 (FIG. 2) to increase in temperature triggering the shut down of the power supply 92.

Although the present invention has been described in considerable detail with reference to certain preferred versions thereof, other versions are possible. For example other types of cooling techniques may be used to maintain the temperature of the sensor and its environment below the threshold temperature. Other techniques may be used for adhering the sensor to the base portion of the channel 62. Other treatments may be used to render the heat conductive frame member corrosion resistant increasing its emissivity with other surface treatments. Therefore, the appended claims should not be limited to the description of the preferred versions contained herein.

We claim:

1. An apparatus for detecting equipment failure caused by exposure to a high energy laser radiation source comprising:
   a. a shield structure for absorbing radiation;
   b. heat sensing means positioned adjacent said shield for sensing changes in temperature said sensing means comprising:
      i. a conductive metal frame having a heat receptive face portion and formed with channel means for receiving a temperature sensing element therein, said temperature sensing element positioned in heat conductive relation to said heat receptive face and being preset at a threshold temperature;
      ii. cooling means for cooling said conductive metal frame to a level below said threshold temperature; and
      iii. control means responsive to said temperature sensing element for de-energizing the high energy laser radiation source when the temperature sensing element exceeds said threshold temperature.

2. The apparatus as claimed in claim 1 wherein the channel means for receiving said temperature sensing element comprises a channel within said conductive frame said channel having side walls spaced apart from said conductive metal frame and a base portion.

3. The apparatus as claimed in claim 2 wherein the thickness of the base portion is in the range of 0.02 inches to 0.04 inches.

4. The apparatus as claimed in claim 2 wherein the temperature sensing element is affixed to the base portion of the channel with a heat conductive adhesive.

5. The apparatus as claimed in claim 4 wherein the heat conductive adhesive is a silicon based material.

6. The apparatus as claimed in claim 5 wherein the silicon based adhesive includes boron nitride.

7. The apparatus as claimed in claim 1 wherein the temperature sensing element is affixed to the conductive frame adjacent the heat receptive face of the conductive metal frame.

8. The apparatus as claimed in claim 7 wherein the conductive metal frame is treated with a coating of radiation absorbing material.

9. The apparatus as claimed in claim 8 wherein the conductive frame surface is coated with black chrome.

10. The apparatus as claimed in claim 1 wherein the cooling means comprises a tubular conduit in heat conductive relation to the channel means for flowing a coolant there through.

11. The apparatus as claimed in claim 1 wherein the channel means comprises an opening in said conductive frame for receiving said temperature sensing element and having side walls in spaced apart relation from said temperature sensing element leaving an air space partially surrounding said sensing element and a base portion for receiving said temperature sensing element.

12. The apparatus as claimed in claim 1 wherein the cooling means for cooling the conductive metal frame comprises heat exchange ducts through which flows a coolant.

13. The apparatus as claimed in claim 1 wherein the cooling means for cooling the conductive metal frame comprises heat conductive fasteners.

14. The apparatus as claimed in claim 1 wherein the cooling means comprises fluid conduits surrounding the channel means, the fluid conduits containing a liquid coolant for maintaining the temperature of the conductive metal frame below the threshold temperature.

15. In an apparatus for generating a high energy laser beam that is directed from a laser generating source to a work station, said apparatus comprising:
   a. a laser gain medium for generating said high energy laser beam;
   b. path means for directing the high energy beam from the laser generating source to said work station;
   c. reflecting means positioned in said path means for changing the direction of the high energy beam as it traverses said path means;
   d. temperature sensor means associated with said reflecting means set at a predetermined threshold temperature for detecting a sudden rise in temperature above said threshold temperature; and
   e. control means responsive to said sensor means for de-energizing said laser generating apparatus when detecting a sudden rise in temperature.

16. In an apparatus for generating a high energy laser beam generated from a laser generating source said beam being capable of developing high temperatures, said laser beam being directed from the laser generating source to a work station where said high temperature is required for accomplishing a work function said apparatus comprising:
   a. path means for directing the laser beam to said work station;
   b. reflector means positioned in said path means for receiving a laser beam and reflecting it along said path changing direction as it traverses said path means;
   c. detector means positioned adjacent said reflector means, said detector means adapted to sense the temperature level of the reflector means as it receives the beam traversing the path means, said detector means being set to a threshold temperature representing a normal operating condition for said apparatus; and
   d. control means responsive to said apparatus sensing said detector means when it senses a temperature above said threshold temperature for de-energizing the laser generating source.

17. The apparatus as claimed in claim 16 wherein said control means includes a normally closed switch and means responsive to said switch for interrupting a power supply to the laser generating source when said sensor senses a temperature above the threshold temperature.

* * * * *